United States Patent [19]

Takagi et al.

[11] 4,084,839
[45] Apr. 18, 1978

[54] GAS BAG PROTECTION APPARATUS FOR VEHICLES

[75] Inventors: Shigeru Takagi, Okazaki; Yoshiyuki Hattori, Nishio, both of Japan

[73] Assignee: Nippon Soken, Inc., Nishio, Japan

[21] Appl. No.: 704,557

[22] Filed: Jul. 12, 1976

[30] Foreign Application Priority Data

Jul. 14, 1975    Japan .................................. 50-86563

[51] Int. Cl.² ........................................... B60R 21/08
[52] U.S. Cl. .................................. 280/736; 280/742; 55/385 R; 55/399
[58] Field of Search ............................... 280/728–742; 55/399, 459 B, 385 R

[56] References Cited

U.S. PATENT DOCUMENTS

| 513,090 | 1/1894 | Day | 55/399 |
| 3,618,980 | 11/1971 | Leising et al. | 280/736 |
| 3,770,387 | 11/1973 | Loomba | 280/736 |
| 3,792,573 | 2/1974 | Borsheim | 55/399 X |

*Primary Examiner*—Kenneth H. Betts
*Attorney, Agent, or Firm*—Cushman, Darby & Cushman

[57] ABSTRACT

A gas bag protection apparatus for protecting occupant of a motor vehicle upon collision thereof, comprises a gas supply source of a high pressure gas, a gas bag normally deflated and operatively inflated upon an emergency, and a diffuser for supplying a high pressure gas from the gas supply source into the bag to be inflated. Improvement resides in provision of a centrifugal separator chamber provided between the gas supply source and the diffuser, for separating, from the high pressure gas flow, residues produced at an explosion of an igniter which is adapted to cause the gas supply source to feed the high pressure gas. A residue collecting cavity may be provided in combination with the separating chamber, both of which may be in a coaxially aligned configuration.

16 Claims, 9 Drawing Figures

GAS BAG PROTECTION APPARATUS FOR VEHICLES

BACKGROUND OF THE INVENTION

1. FIELD OF THE INVENTION

The present invention relates to a gas or air bag apparatus for protecting occupants of a vehicle such as motor vehicles from being injured upon the collision of the vehicle at a high speed by virtue of inflation or expansion of the gas bag. In particular, the invention relates to a gas-bag protection apparatus of the above type in which means are provided to effectively remove explosion residues which consist of fragments of electrical ignitors, retainer member or the like produced upon the operation of the apparatus, and which is carried by a high pressure gas flow directed into the gas bag to be inflated.

2. DESCRIPTION OF THE PRIOR ART

In the case of hitherto known gas bag protection apparatus, a gas bomb or container containing a gas under a high pressure is connected to a diffuser simply through a duct, whereby the gas bag is adapted to be expanded or inflated by the high pressure gas flow blown into the gas bag through the diffuser. When the protection apparatus is operated in response to the collision of the vehicle, explosion fragment residues are produced as a result of the explosion of the ignitors, destruction of the retainer member of rubber and the like for holding the ignitors in place. Since these residues are included in the high pressure gas flow discharged from the gas bomb and are harmful for the gas bag apparatus, it is common to remove the residues by a filter composed of a wire-gauze wound a few turns and disposed in the diffuser.

However, with such arrangement, the filter positioned in the diffuser will be likely to be clogged due to a relatively large quantity of the residues produced. Consequently, the pressure in the gas flow to be fed into the inflatable gas bag from the diffuser is decreased, resulting in a deteriorated inflation performance of the gas bag. This is not only disadvantageous in view of obtaining the stabilized operation of the gas bag safety apparatus, but also dangerous in that the duct or like elements should possibly be destroyed by the gas flow of an increased pressure at the uptream side of the clogged filter.

SUMMARY OF THE INVENTION

Accordingly, an object of the invention is to provide an improved gas bag protection apparatus which avoids the disadvantages of the hitherto known gas bag apparatus and allows a stabilized and reliable inflation performance of the gas by assuring positive separation of the explosion residues.

Another object of the invention is to provide an improved gas bag protection apparatus which is provided with a residue collecting chamber to trap and retain the residues therein without permitting escape of the trapped residues therefrom.

Still another object of the invention is to provide a gas bag apparatus of the above type which may be effectively operated without the use of the filter in the diffuser.

With the above objects in view, the present invention provides a gas bag protection apparatus wherein a high pressure gas is released from a gas supply source upon an emergency into a gas bag through a diffuser thereby to inflate the gas bag, comprising a gas flow path which includes a residues separating chamber for separating, from the released gas, such residues as produced when the high pressure gas is released and carried by the gas under the influence of the centrifugal force exerted to the gas flow containing the residues, a discharge passage for guiding the high pressure gas flow release from the gas supply source into the residue separating chamber in the direction tangential to the residue separating chamber and a conduit projecting into the residue separating chamber substantially at the center portion thereof and servicing to direct the high pressure gas flow into the diffuser.

According to another feature of the invention, there is provided a gas bag protection apparatus comprising a residue collecting cavity formed in the residue separating chamber so as to collect and trap the residue separated from said high pressure gas flow.

The above and other objects, features and advantages of the invention will become more apparent from the detailed descriptions of preferred embodiments of the invention, referring to the drawings.

DETAILED DESCRIPTION OF PREFERRED EMBODIMENTS

Figure 1:
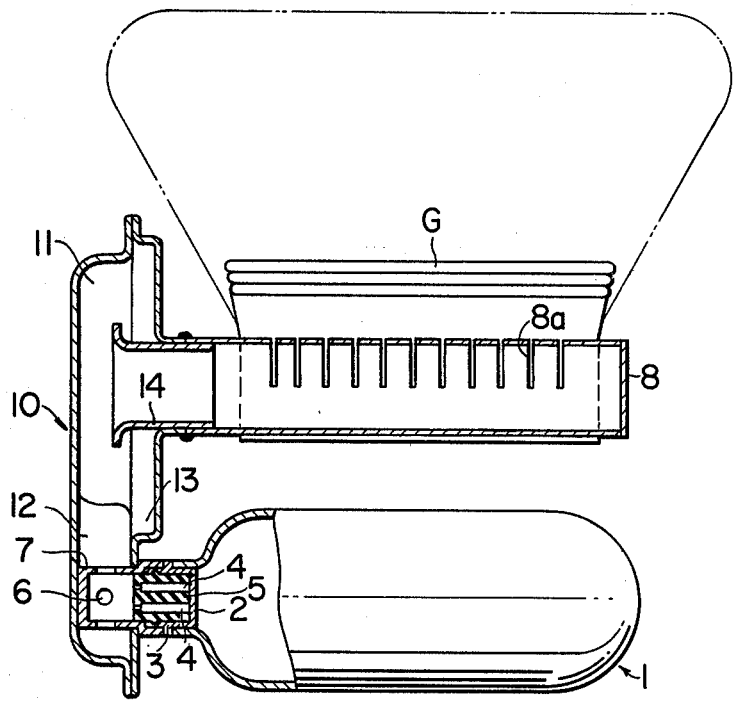
FIG. 1 is an elevational view showing partially in section a gas bag apparatus according to a first embodiment of the invention.
Figure 2:
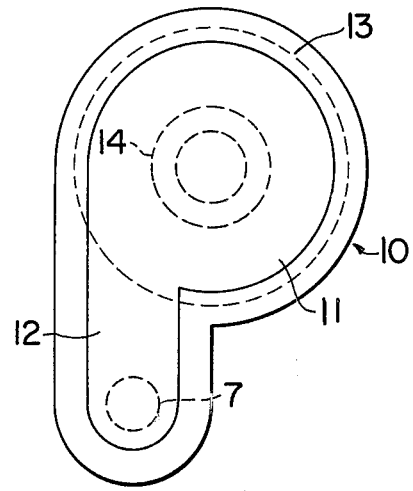
FIG. 2 is a side view of the same.

Now the invention will be described in detail in conjunction with the exemplary embodiments shown in the drawings. Referring to FIGS. 1 and 2 showing a gas bag protection apparatus according to the first embodiment of the invention, reference numeral 1 denotes a hybrid-type gas bomb containing a gas at a high pressure and incorporating therein a gas generating material or agent which constitutes a source of a high pressure gas. The gas bomb or container 1 has an opening which is fluid-tightly closed by a cock 3 having a sealing plate 2. A pair of electric ignitors 4 are held in place by means of a retainer 5 at one side of the sealing plate 2 opposite to the gas container 1.

A nozzle 7 having four discharge orifices 6 is connected to the opening of the gas container 1. The high pressure gas as released from the gas container is adapted to be discharged through the nozzle orifices 6.

A diffuser 8 having a plurality of slits 8a serves to feed the high pressure gas flow into a deflated gas bag G to thereby inflate the latter as indicated by the phantom line in FIG. 1. In this connection, it will be noted that no filter is provided in the diffuser 8.

Reference numeral 10 designates a flow path assembly for a high pressure gas, according to the teaching of the present invention. The flow assembly 10 serves to direct the high pressure gas discharged from the gas container 1 through the nozzle 7 into the diffuser 8 and at the same time to separate residues produced upon the explosion of the electric ignitors 4 from the high pressure gas flow carrying them. To this end, the flow path assembly 10 includes a residue separating chamber 11, discharge passage 12, a residue collecting or accommodating chamber 13 and a flared pipe 14. These components are made of a material having a sufficient mechanical strength. For example, the individual components of the flow path 10 may be formed of a steel plate by press work and combined with one another by welding to form the integral flow path assembly 10, which is then fixedly connected to the gas bomb 1 and the diffuser 8 by means of weld, screw bolt or the like.

The residue separating chamber 11 is formed substantially as a cylindrical basin so that the high pressure gas flown into the chamber 11 may produce a vortex flow of gas in the chamber 11 which permit the separation of the explosion residues and the high pressure gas due to difference in the centrifugal forces imparted to the residues and the gas based on the difference in mass between them. To this end, it can be seen from FIG. 2 that the residue separating chamber 11 is so constructed that the gas flow is discharged into the chamber 11 in the tangential direction relative thereto from the discharge passage 12.

The wall defining the residue separating chamber 11 is formed slightly conical so that the explosion residues separated under the action of the centrifugal force may be readily trapped into the residue collecting or trapping cavity 13 which is formed integrally with the residue separating chamber 11 along the outer periphery thereof and positioned at the right hand side of the chamber 11 as viewed in FIG. 1. With such arrangement, the residue collecting chamber 13 will function to collect and retain the separated explosion residues in a desirable manner and prevent the residues from being scattered away from the chamber on cavity 13.

The flared pipe 14 is so positioned as to protrude in the residue separating chamber 11 substantially at the center position thereof and serves for directing the pure high pressure gas free of the residues into the diffuser 8. The pipe 14 is formed in a flared form at the opening portion thereof positioned in the residue separating chamber 11 so as to facilitate the gas flowing into the pipe 14. The flared pipe 14 may be formed separately from the chamber constituting the residue collecting cavity or chamber 13 and connected thereto by welding.

Figure 3:
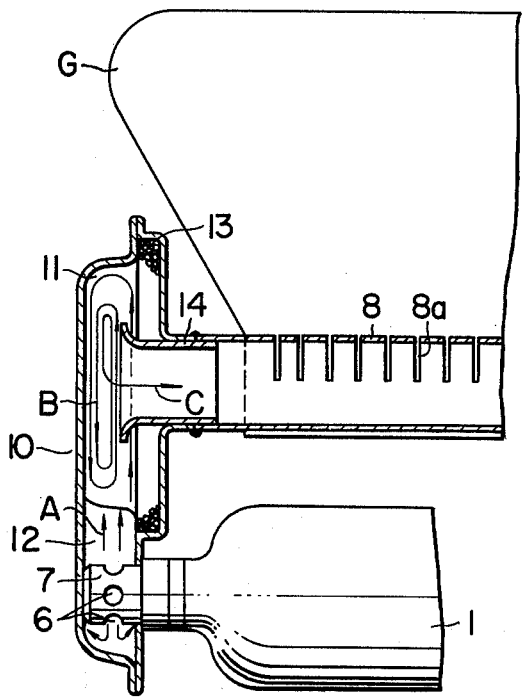
FIGS. 3 and 4 are similar views to FIGS. 1 and 2 to illustrate the operation of the air-bag apparatus, shown therein.
Figure 4:
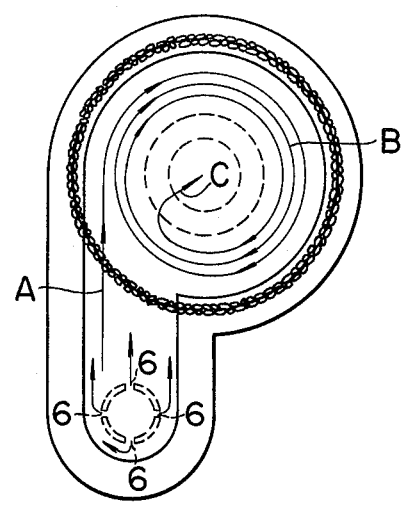

Operation of the apparatus having the structure mentioned above will now be described by referring to FIGS. 3 and 4. When collision of a motor vehicle installed with the gas bag protection apparatus according to the invention should occur, a conventional collision detecting sensor not shown will produce a collision signal. In response to the signal, the electrical ignitors 4 are instantaneously exploded to destroy the sealing plate 2, thereby to open the blocked opening of the gas container 1. Simultaneously, the gas generating agent accommodated within the gas container 1 will be ignited, whereby a high pressure gas as generated is discharged from the orifices 6 of the nozzle 7.

Obviously, the high pressure gas flow contains the explosion residues such as fragments of the exploded ignitors 4, the destroyed retainer members 5 and the sealing plate 2. Flowing direction of such high pressure gas is straightened in the discharge passage 12 and the gas is discharged into the residue separating chamber 11 in the tangential direction relative thereto, as indicated by the arrow A. Consequently, the high pressure gas flow carrying the explosion residues will develope itself into a vortex flow in the chamber 11, as indicated by the arrows B. The explosion residues having greater mass than the gas tend to be collected at the peripheral portion of the residue separating chamber in a form of the basin-like structure and thus to be separated from the gas. The separated residues will then be trapped in the residue collecting cavity 13 without being scattered away again into the gas flow.

The purified gas flow separated from the residues in the above described manner is then fed into the diffuser 8 from the separating chamber 11 through the flared pipe 14 positioned substantially at the center of the chamber 11 as indicated by the arrow C and hence injected into the protection bag G through the slits 8a formed in the diffuser 8, thereby it inflates the bag G in a desired manner.

From the foregoing description, it will be appreciated that the gas bag apparatus according to the invention does not require any filters as conventionally employed, and may assure an improved gas release or discharge characteristic to bring about an instantaneous and reliable inflation of the gas bag G, whereby the occupant of the vehicle is protected from the secondary collision within the compartment of the vehicle.

Figure 5:
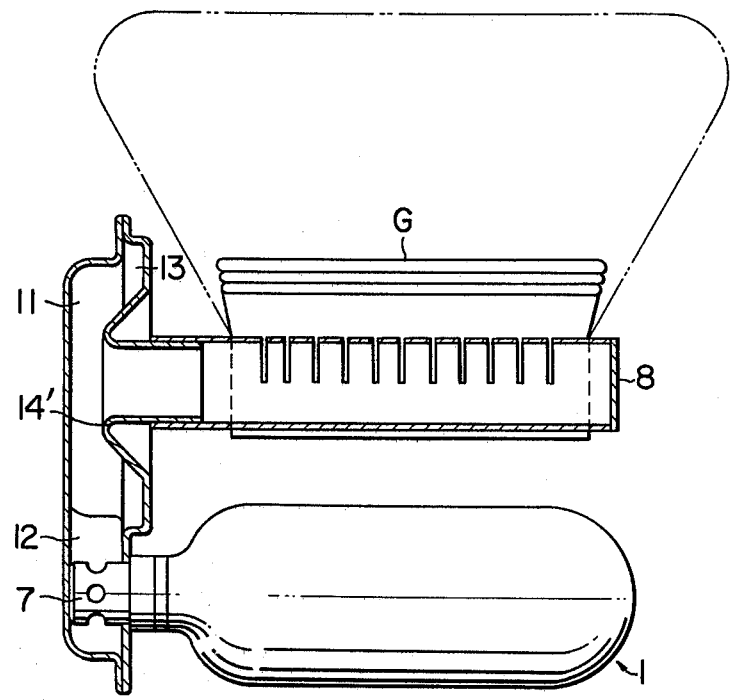
FIG. 5 is an elevational view showing partially in section a second embodiment of the invention.

FIG. 5 shows a second embodiment of the present invention which is differed from the first embodiment described above in conjunction with FIGS. 1 to 4 in the respect that the flared pipe 14' is formed integrally with the member forming the residue collecting cavity or chamber 13, instead of of being separately formed as in the case of the first embodiment. With such structure, the number of the constituent members of the apparatus can be reduced as advantageously accompanied with facilitated assemblying of the apparatus.

Figure 6:
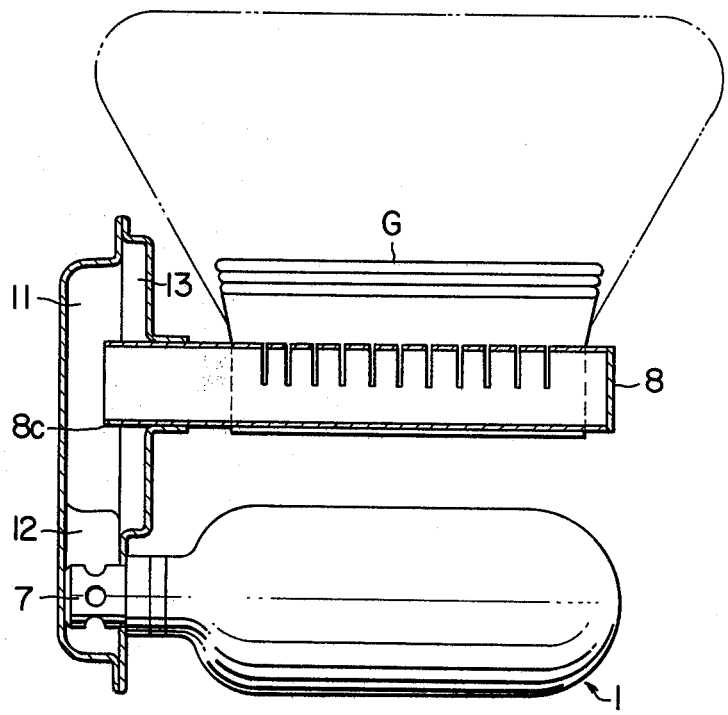
FIG. 6 is a similar view to FIG. 5 and shows a third embodiment of the invention.

FIG. 6 shows a gas bag apparatus according to the third embodiment of the present invention. In the case of this embodiment, one end portion 8c of the diffuser 8 extends into the residue separating chamber 11 so that the diffuser 8 may serve also as the flare pipe 14 shown in FIG. 1. This structure also involves similar advantages as those of the second embodiment shown in FIG. 5.

Although it is assumed in the above description that a gas generating agent is employed as the supply source of the high pressure gas, it is obvious that other type of gas supply source such as a bomb or container containing an inert gas such as nitrogen gas under a high pressure can be equally used with same advantages.

Figure 7:
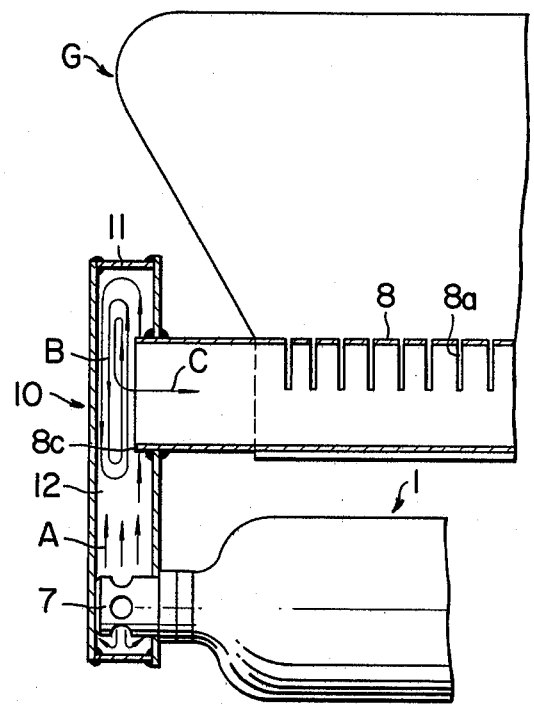
FIGS. 7 and 8 show a fourth embodiment of the invention in partially sectioned elevational and side views, respectively.
Figure 8:
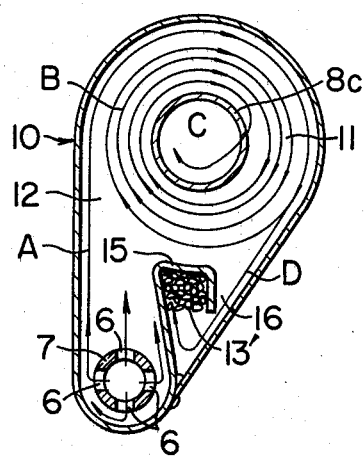

Referring to FIGS. 7 and 8 showing the fourth embodiment of the invention, the residue separating chamber 11 and the residue collecting cavity 13' are separated by a partition wall 15 so that the chamber 11 and the cavity 13' can be communicated with each other only through an opening 16 formed in the residue separating chamber 11 at an outer peripheral portion thereof. As can be seen from FIG. 8, the partition wall 15 is bent in L-like form to facilitate the flowing of residues into the collecting chamber 13'. The residue separating chamber 11, discharge passage 12 and the residue collecting cavity 13' may be formed of a single sheet of steel plate by bending it in a manner shown in FIG. 8 and securing side plates of steel onto the bent structure by welding or the like means.

In operation, the blocked opening portion of the gas container is exploded upon the collision with another vehicle as in the case of the embodiments described hereinbefore, whereby the high pressure gas is discharged from the orifices 6 of the nozzle 7, as indicated by arrows. The gas flow containing the broken fragments or pieces of the electrical ignitors 4 and retainer 5 is rectified in the passage 12 in respect to the flowing direction and enters the residue separating chamber 11 in the tangential direction to the chamber, as indicated by the arrows A. As a result, a vortex flow is formed in the chamber 11 as indicated by the arrows B. Since the explosion residues have greater mass than the flowing gas, the former is progressively displaced toward the peripheral portion of the residue separating chamber 11 under the centrifugal force exerted to the residues during the revolution in the chamber 11 and finally trapped by the residue collecting cavity 13' through the opening 16, as indicated by the arrow D. The trapped residues will never be scattered away from the cavity 13'. The apparatus described above will provide similar advantages as those of the first embodiment and can be manufactured inexpensively in a simplified manner. It will be self-explanatory that the volume of the residue collecting cavity 13' may be correspondingly selected in dependence of predictable amount of the produced residues.

Figure 9:
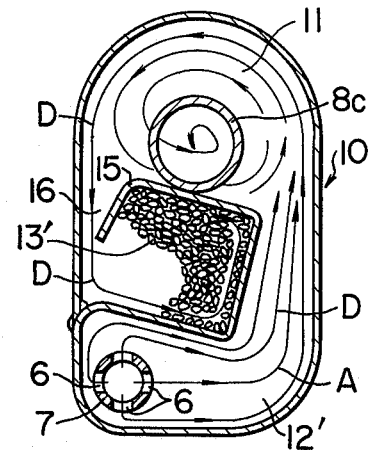
FIG. 9 shows a gas bag apparatus according to a fifth embodiment of the invention in a cross sectional view.

In the fifth embodiment of the invention shown in FIG. 9, the discharge passage 12' is bent about 90° with such arrangement, the high pressure gas flow as discharged from the orifices 6 of the nozzle 7 is turned toward the direction as indicated by the arrow A before it enters the residue separating chamber 11 in the tangential direction thereto. The residues having greater mass are thus more positively directed toward the enclosure wall constituting the chamber 11, as indicated by the arrow D due to the more effective centrigugal force produced during the turning at the corner portion of the passage 12' as well as in the separating chamber 11, whereby the residue may be more positively separated from the gas and trapped in the collecting chamber 13' without being scattered again into the gas flow.

Although the invention has been described in conjunction with the preferred embodiment in the foregoing, it will be appreciated that the invention is never restricted to these embodiment but many modifications and variations may be easily made by those skilled in the art without departing from the scope and spirit of the invention.

What we claim is:

1. A gas bag protection apparatus comprising:
   i. A gas bag having a normally deflated condition, said gas bag being inflated operatively upon an emergency;
   ii. a diffuser communicated with said gas bag, for feeding high pressure gas into said gas bag;
   iii. a gas supply source located in juxtaposed relationship with said diffuser for supplying high pressure gas into said gas bag through said diffuser, for inflating said gas bag;
   iv. a residue separating chamber of substantially cylindrical configuration having a slightly conical wall for separating, from the high pressure gas, such residues as produced when the high pressure gas is released and as carried by said high pressure gas, under the influence of the centrifugal forces induced in the gas flow containing said residues;
   v. a straight discharge passage connected between said gas supply source and said residue separating chamber for guiding said high pressure gas flow discharged from said gas supply source into said residue separating chamber in the direction tangential to said residue separating chamber, thereby to cause said high pressure gas flow to circulate along the inner periphery of the slightly conical wall of said residue separating chamber; and
   vi. a conduit having an inlet end projecting into said residue separating chamber substantially at the center portion of the latter and serving to guide said high pressure gas flow toward said diffuser.

2. A gas bag apparatus as set forth in claim 1, wherein the inlet end portion of said conduit is in a flared configuration.

3. A gas bag apparatus as set forth in claim 1, further comprising a residue collecting cavity disposed in said residue separating chamber opposite to the slightly conical wall to collect and trap the residues separated from said high pressure gas flow.

4. A gas bag protection apparatus as set forth in claim 3, wherein said residue collecting cavity is of a substantially cylindrical configuration.

5. A gas bag protection apparatus comprising:
   a gas bag having a normally deflated condition, said gas bag being inflated operatively upon an emergency;
   a diffuser communicated with said gas bag, for feeding high pressure gas into said gas bag;
   a gas supply source located in juxtaposed relationship with said diffuser for supplying high pressure gas into said gas bag through said diffuser, for inflating said gas bag;
   a residue separating chamber partially defined by a cylindrical wall for separating, from the high pressure gas, such residues as produced when the high pressure gas is released and as carried by said high pressure gas, under the influence of the centrifugal forces induced in the gas flow containing said residues;
   a discharge passage connected between said gas supply source and said residue separating chamber for guiding said high pressure gas flow discharged from said gas supply source into said residue separating chamber in the direction tangential to said cylindrical wall of said residue separating chamber, thereby to cause said high pressure gas flow to circulate along the inner periphery of the cylindrical wall of said residue separating chamber; and
   a conduit having an inlet end projecting into said residue separating chamber substantially at the center portion of the latter and serving to guide said high pressure gas flow toward said diffuser.

6. A gas bag protection apparatus as in claim 5, further comprising:
   a residue collecting cavity disposed in said residue separating chamber for collecting said residues separated in said residue separating chamber,
   said cavity being located downstream of said inlet end of said conduit projected into said separating chamber so that said residues are prevented from passing through said inlet end.

7. A gas bag protection apparatus as in claim 5, further comprising:
   means for defining an opening at a position on the tangential extension of said cylindrial wall, opposite to the position where said tangential guidance of said high pressure gas occurs, to pass said residues therethrough, and a residue collecting cavity connected to said opening to trap said residues from said opening, wherein said residue separating chamber, discharge passage, opening and cavity are formed by a single continuous metal sheet.

8. Gas bag protection apparatus as in claim 5 and further comprising a residue collecting cavity provided for said residue separating chamber so as to collect and trap the residues separated from said high pressure gas.

9. A gas bag protection apparatus as set forth in claim 8, further comprising a partition wall for separating said residue separating chamber and said residue collecting cavity from each other, and an opening for passing said residues into said cavity from said chamber.

10. A gas bag protection apparatus as set forth in claim 8, wherein said discharge passage is bent in an intermediate portion so as to readily separate said residues from said high pressure gas flow.

11. A gas bag protection apparatus as set forth in claim 8, further comprising a partition wall for defining said discharge passage and said residue collecting cavity which communicates with said residue separating chamber through a narrow opening for passing said residues from said chamber.

12. In an emergency gas bag protection apparatus the improvement comprising:

an inflatable gas bag having a normally deflated condition;

diffuser means including an inlet end for receiving high pressure gas and feeding same into said gas bag;

a residue separating chamber having an at least partially cylindrically configured wall disposed substantially concentrically about said inlet end of said diffuser means and having a side opening in said wall;

gas supply means including residue developing means and nozzle means for supplying residue laden high pressure gas from said nozzle means; and means forming a passageway having said nozzle means in one end and having at its other end an exterior straight wall merging tangentially with said chamber wall at said side opening for directing said residue laden high pressure gas substantially parallel to said straight wall at least where it merges with said chamber wall to cause the high pressure gas to circulate in said chamber adjacent said chamber wall and around said diffuser means inlet with induced centrifugal forces for effecting in said chamber the separation of said residues from said gas and feeding the latter into said diffuser means inlet.

13. Apparatus as in claim 12 and further comprising residue collecting means for trapping the residues separated from said high pressure gas.

14. Apparatus as in claim 13 wherein said residue collecting means includes a collecting cavity of cylindrical configuration disposed substantially concentrically with and facing said separating chamber while surrounding said diffuser means inlet end at a point downstream of the gas inlet end.

15. Apparatus as in claim 13 wherein said residue collecting means includes a partition one side of which is part of said passageway forming means and another side of which defines part of said separating chamber with means including the opposite surface of said sides forming a residue trap and having an opening for receiving residues tangentially thrown from said chamber.

16. Apparatus as in claim 13 wherein said residue separating chamber, passageway forming means and residue collecting means are made by a single continuous metal sheet which has an intermediate part of said passageway forming means bent back into substantially a U-shaped configuration for forming a trap for the residues separated from said high pressure gas.

* * * * *